Jan. 27, 1959                    A. BLOCH                    2,870,914
                           LIQUID FILTER STRUCTURE
Filed March 6, 1957                                      2 Sheets-Sheet 1

INVENTOR
ALEXANDER BLOCH
BY
Curtis, Morris & Safford
ATTORNEYS.

Jan. 27, 1959  A. BLOCH  2,870,914
LIQUID FILTER STRUCTURE
Filed March 6, 1957  2 Sheets-Sheet 2
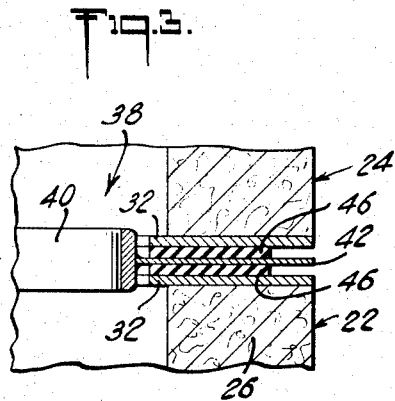
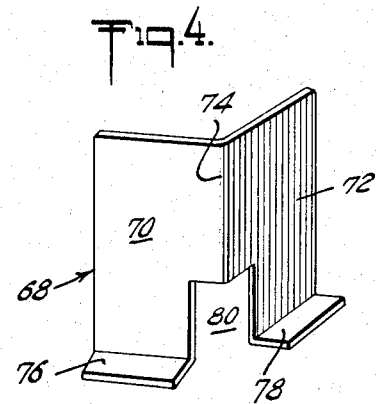
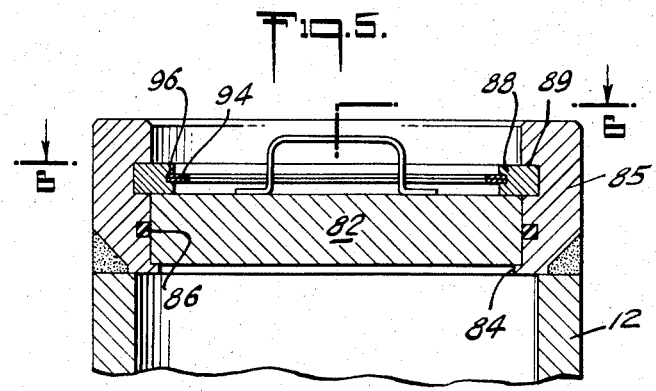
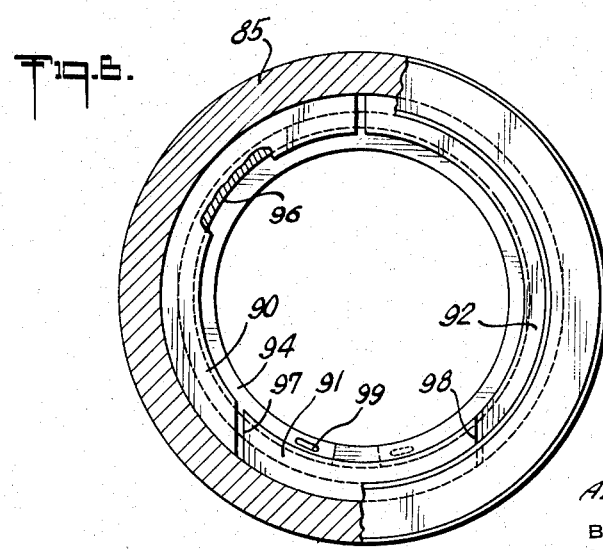
INVENTOR
ALEXANDER BLOCH
BY
Curtis, Morris & Safford
ATTORNEYS

United States Patent Office 2,870,914
Patented Jan. 27, 1959

2,870,914

LIQUID FILTER STRUCTURE

Alexander Bloch, East Norwalk, Conn., assignor to Consolidated Diesel Electric Corporation, Stamford, Conn.

Application March 6, 1957, Serial No. 644,262

3 Claims. (Cl. 210—453)

This invention relates to an improved and simplified structure for a liquid filter of the type employing replaceable filter cartridges.

An object of this invention is to provide a liquid filter unit which is rugged and efficient and which can easily and quickly be assembled or dis-assembled in the field with a minimum of effort and without special equipment.

A more specific object is to provide an improved liquid filter using a removable filter cartridge comprised by a single or multiple elements, the structure of the filter permitting both relatively large flow of liquid through it and, with only brief interruption of the flow of the liquid, quick and easy replacement of the filter cartridge.

A further object is to provide such a filter which is compact and is inexpensive to manufacture.

These and other objects will in part be pointed out in and in part understood from the following description.

The present invention provides a filter unit which is extremely simple and easy to service but yet has a high flow capacity and efficiency.

In accordance with the present invention, in one specific embodiment thereof, the housing of a filter for liquids such as oil is provided with a disc-shaped top held in place by an expansible and preferably resilient snap ring and sealed against the body of the housing by a peripherial circular gasket. The interior of the housing is provided with unique supporting and centering elements for properly positioning one or more cylindrical filter cartridges therein. Further, provision is made to prevent any liquid from bypassing the filter cartridge by flowing around or between its ends. Moreover, the liquid inlet to the housing is specially arranged so that sudden flow of liquid cannot damage or dislocate the cartridge whereby, in spite of the fact that it is readily removable, it will remain seated in proper position within the filter housing until intentionally removed.

To accommodate exceptionally high internal pressure in the filter, a modified top locking arrangement is also provided wherein the main force or pressure against the top is borne by a quickly removable though strong retaining ring which is, in turn, held in place by a light expansible and preferably resilient snap ring.

A better understanding of the invention together with a fuller appreciation of its many advantages will best be gained from the following description given in connection with the accompanying drawings in which:

Figure 3 is an enlarged section view of a portion of the spacing member showing how filter cartridges are seated on it;

Figure 4 is a perspective view of a liquid diverting vane positioned adjacent the inlet port of the filter;

Figure 5 is a vertical sectional view of a modified form of cover or top for the filter which makes it suitable for high pressure operation; and Figure 6 is a top view of the cover shown in Figure 5, partly in section and partly in elevation.

Figure 1:
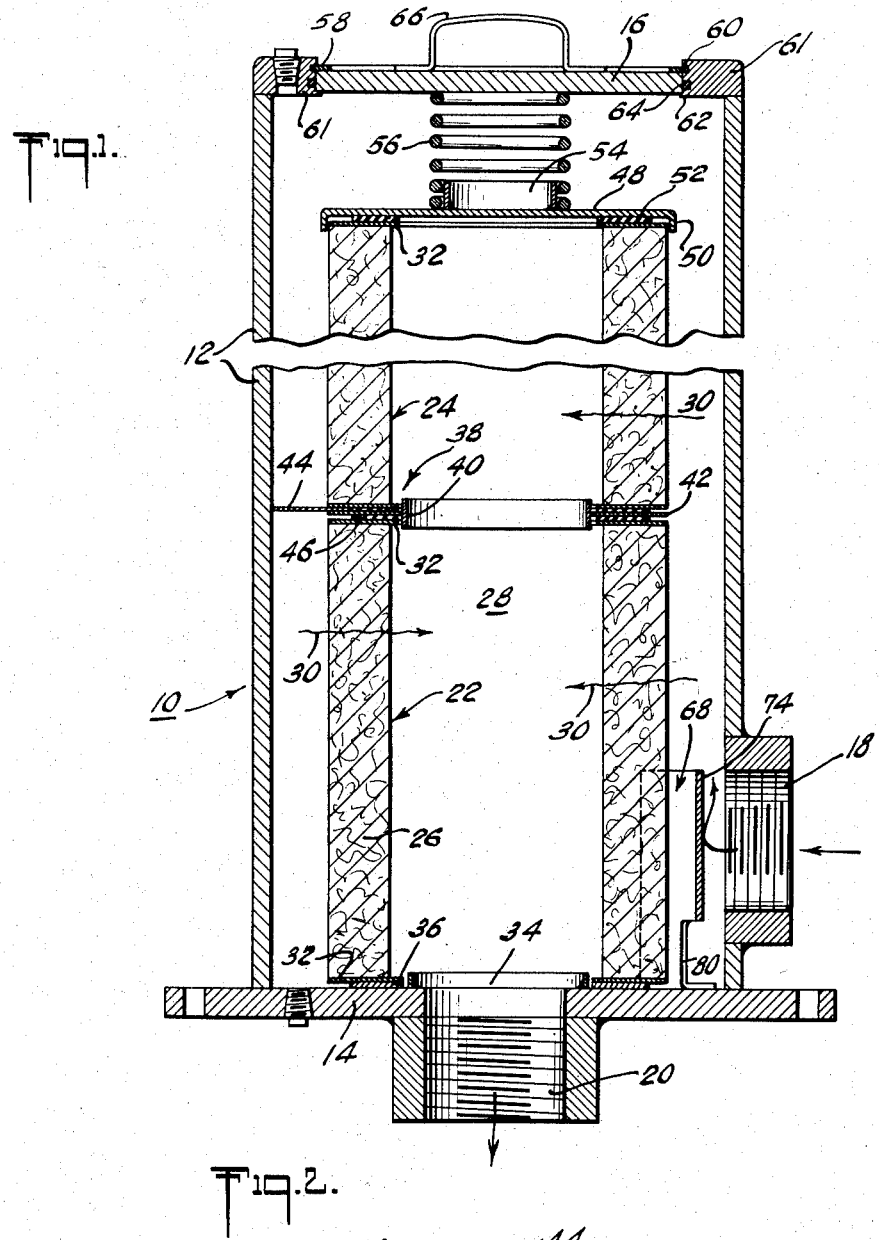
Figure 1 is a vertical sectional view of a filter unit embodying features of the invention.

A liquid filter 10 having a cylindrical housing 12, a permanent bottom plate 14 and a removable top or cover plate 16, is provided with a liquid inlet opening 18 and an outlet opening 20 (see Figure 1). Removably disposed within the housing are two hollow cylindrical filter cartridges 22 and 24 which can be identical and which are stacked end to end or one on top of the other. These cartridges are of a kind well known and commercially available. Each includes a cylindrical wall 26 of a suitable filtering material surrounding a large central opening or tunnel, as inner chamber 28 extending co-axially within housing 12. The number of these filter elements may be varied as conditions require. The liquid to be filtered is caused to flow radially through the walls 26 in the direction of arrows 30, after leaving the inlet 18 and through the outer chamber or space between the cartridges and housing or casing 12, into the central opening 28 and thence through outlet port 20. Each filter cartridge is covered on its respective ends by thin metal annular washers or sealing and bearing plates 32 whose internal diameter is slightly less than that of the filter walls 26, thus overlapping said walls. The inner edges of these washers facilitate alignment of the cartridges with respect to the filter housing.

Positioned above and around the mouth of outlet opening 20 is the cylindrical flange 34 over which the bottom washer 32 of filter cartridge 22 is fitted. Squeezed between this bottom washer and bottom plate 14 to prevent bypass of unfiltered liquid under the bottom of the cartridge is a compressible gasket ring 36.

Figure 2:
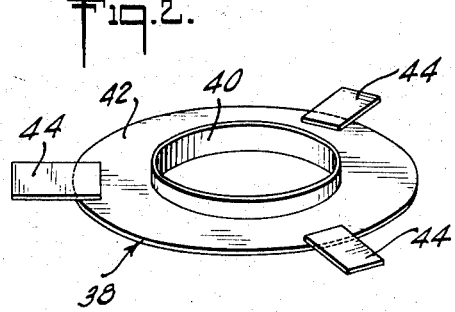
Figure 2 is a perspective view of a spacing member which removably fits within the filter housing.

Supporting and aligning the junction between the top of cartridge 22 and the bottom of cartridge 24 is a unitary spacing member 38 (see Figure 2) which comprises a cylindrical collar 40 to which is fastened a radially extending flat supporting ring or flange 42. This ring, in turn, carries three or more radial lugs 44 which extend to and contact the inside of the wall of housing 12 and maintain the member 38 concentric within the housing. As seen in enlarged detail in Figure 3, the adjacent end washers 32 on cartridges 22 and 24 loosely encircle collar 40; and two flat liquid sealing compressible gasket rings 46, similar to ring 36, are squeezed between these washers and the flat supporting ring 42, respectively.

The top of the upper cartridge 24 is covered by a thin cap plate 48 having a downwardly turned edge 50 (see Figure 1). Squeezed between this plate and the top washer 32 of cartridge 24 is another liquid sealing compressible gasket 52.

Extending upwardly from the cap plate 48 is a centrally mounted short cylindrical flange 54. A compression spring 56 is positioned by this flange 54 and its upper end bears against housing top or cover 16, to which the spring may or may not be fastened. Similarly, spring 56 at its lower end may or may not be fastened to cap plate 48 but in any event, the short cylindrical flange 54 provides a convenient finger grip for the easy removal of this cap plate.

The housing top or cover 16 is retained in place by a light expansible snap ring 58 which engages in a shallow groove 60 in a top end surface 61 of the housing and lies just above the top surface of cover 16. The bottom rim or edge of the cover rests on a thin lip 62 whose inside diameter is nonetheless large enough to permit removal of cap plate 48, the filter cartridges and the spacing member 38. The lip 62 prevents cover plate 16 from accidentally being pushed into housing 12. A liquid seal between the side rim of cover 16 and shoulder 61 of the housing is provided by the thin gasket ring 64 which is located in a shallow groove in shoulder 61 and fits snugly against the peripheral surface of cover 16.

When the filter unit is assembled as shown, spring 56 presses the filter cartridges down against the compressible gaskets 36, 46 and 52 while the spacing member 38 and the bottom circular flange 34 keep the cartridges concentric within the housing when it is either horizontal or vertical. The housing can be opened simply by disengaging snap ring 58, thereafter, by means of a handle 66 provided on top of the cover 16, the cover can be removed and the filter cartridges withdrawn from the housing of the filter. Because spacing member 38 is provided with spacers rather than a continuous radial ring reaching to the inside wall of the housing, this member can be removed through the reduced diameter opening in the top of the housing. Moreover, the spaces between these spacers allow unimpeded flow of liquid to and through cartridge 24.

Positioned just in front of inlet opening 18 is a flow diverting vane 68 (see Figure 4) which prevents a sudden inrush of liquid from dislodging filter cartridge 22. This vane includes two plates 70, 72 which are angularly inclined to each other and are joined together along the line 74. This line 74 is positioned vertically along the center of inlet opening 18 and the vane is supported by feet 76, 78 which are secured to the bottom plate 14 of the housing, as by welding. The lower center part of vane 68 is cut away to provide the opening 80. Liquid entering the housing is deflected by the vane and flows around, above and below it thus helping distribute the flow of liquid through the filter cartridges and to evenly distribute the sediment which will be deposited on them.

To increase the capacity of the filter, its housing can be lengthened and one or more additional filter cartridges stacked within it. This is an important manufacturing convenience. Spring 56, which holds the cartridges properly positioned, allows for minor variations in the lengths of the various elements of the filter.

Figures 5 and 6 show a modified top closure arrangement for the filter which renders it suitable for high pressure operation. This includes a thick disc top 82 which is seated on a lip 84 of a heavy end shoulder 85 of the housing cylinder 12. The rim of top 82 is sealed by a gasket ring 86, suitably of rubber, which is seated in a recess in shoulder 85. Holding top cover 82 seated is a heavy rigid ring 88 engaged in a corresponding groove 89 in shoulder 85. This ring 88 is made in three separate sections 90, 91, 92 (Figure 6) so that it is completely removable from groove 89. Holding these three sections seated in the groove is a light retaining expansible snap ring 94, comprising two flat turns of a metal strip, which engages in a groove 96 in the three sections 90, 91, 92. To remove top 82, snap ring 94 is disengaged by means of a tool engaged with the aperture 99 in the end of the ring 94, then ring section 91 having parallel ends 97 and 98 and which acts as the key of an arch, is moved inward thereby unlocking the remaining ring sections 90 and 92 of the ring 88. Since the heavy ring 88 can be made as strong as needed, great pressure can be borne by this top closure arrangement.

The above description of the invention is intended in illustration and not in limitation thereof. Various changes may occur to those skilled in the art and these may be made without departing from the spirit or scope of the invention as set forth.

I claim:

1. Filter apparatus comprising in combination a tubular casing having a closed end and an open end provided with a removable cover, and filtering means including a plurality of tubular filter cartridges assembled end to end in said casing and forming therewith in effect an outer chamber having an inlet port and an inner chamber having an outlet port, said cartridges being readily insertable into and removable from said casing through said open end, and each of said cartridges having a flat annular bearing and sealing plate at each end, removable cartridge positioning and guiding means slidable to and from operative position longitudinally in the casing and including a collar disposed coaxially in said inner chamber and overlapping opposed end portions of adjacently positioned cartridges when assembled therewith, said collar having a flat peripheral annular flange extending between said opposed cartridge ends, and said flange having circumferentially spaced lugs extending radially therefrom across said outer chamber without impeding the flow of liquid therethrough and whereby said cartridges, said collar and said flange are retained substantially coaxial in said casing, and spring means between the cover and an end one of said cartridges assembled in the casing for exerting endwise pressure thereon and thereby retaining said cartridge ends in effective non-leaking engagement one with another and with portions of said casing.

2. Filter apparatus according to claim 1 and wherein each of said annular bearing and sealing plates has a central opening of less diameter than that of said inner chamber and sufficiently greater than that of said collar to restrict lateral displacement of the plates and the cartridges in relation to said collar when the parts are in operative assembled relation with said plates embracing said collar.

3. Filter apparatus according to claim 1 and wherein a baffle is arranged in the outer chamber between a filter cartridge and the inlet port, said baffle comprising flat deflector plates converging toward said port to form a ridge extending opposite the inner end opening of the port and extending longitudinally of the casing, said baffle being arranged and adapted to divide the inflow of liquid for substantially uniform distribution over the exterior surface of the assembled filter cartridges.

References Cited in the file of this patent

UNITED STATES PATENTS

| | | |
|---|---|---|
| 1,017,083 | Cuppel | Feb. 13, 1912 |
| 1,144,854 | Lass | June 29, 1915 |
| 2,113,923 | Miller | Apr. 12, 1938 |
| 2,203,364 | Rathbun | June 4, 1940 |
| 2,298,511 | Rathbun | Oct. 13, 1942 |
| 2,302,489 | Brown | Nov. 17, 1942 |
| 2,436,407 | Stephens | Feb. 24, 1948 |
| 2,586,033 | Haley | Feb. 19, 1952 |
| 2,738,879 | Frantz | Mar. 20, 1956 |
| 2,744,632 | Gardes | May 8, 1956 |
| 2,766,890 | Kasten | Oct. 16, 1956 |